July 13, 1926.
O. TANNERT
ANODE BATTERY
Filed Nov. 24, 1924
1,592,678
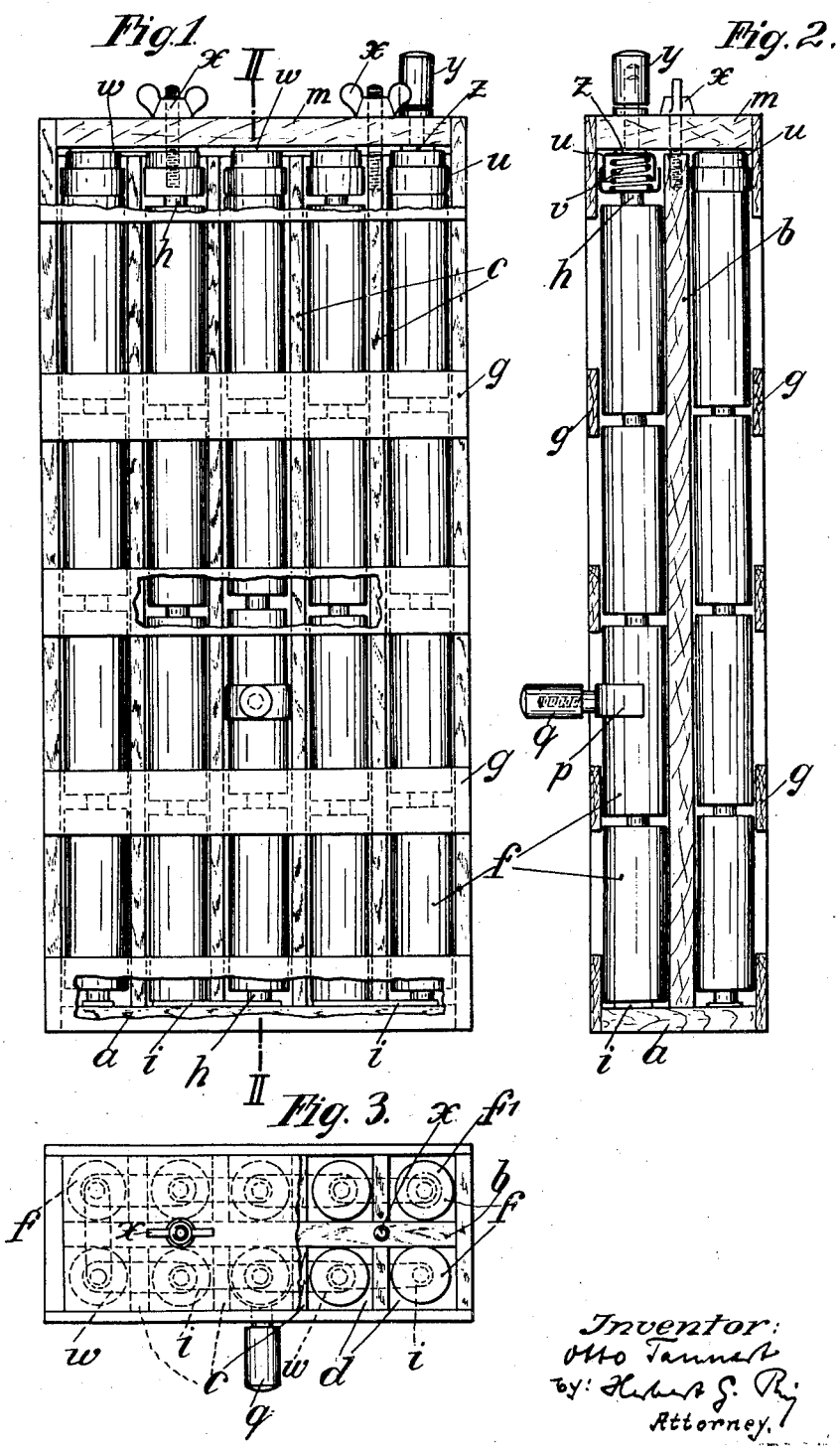
Inventor:
Otto Tannert
by: Herbert G. Ry
    Attorney.

Patented July 13, 1926.

1,592,678

UNITED STATES PATENT OFFICE.

OTTO TANNERT, OF BERLIN, GERMANY, ASSIGNOR TO R. SACHS G. M. B. H., OF BERLIN SO., GERMANY, A GERMAN COMPANY.

ANODE BATTERY.

Application filed November 24, 1924, Serial No. 752,045, and in Germany August 13, 1924.

This invention relates to batteries such as used in the anode circuits of wireless apparatus.

In the anode battery according to the present invention, canister-like single battery cells the walls of which are of exposed zinc and constitute the negative plate of each element, are arranged in columnar groups in a crate-like frame. The individual elements are, without any special connectors, connected in series merely by mutual contact and are held together by being pressed against one another in the frame, so that on release of the devices which clamp the cells together, the cells can be individually removed from the frame and if necessary be exchanged.

Whereas with existing anode batteries a tapping point is provided on the end face of each individual cell, to which the wander plug of the tapping lead can be connected, with the anode battery according to the present invention it is possible to tap off the current at any desired point from the side, without it being necessary to provide any special tapping point on the cell itself. The current can be taken off in a very simple manner by the application of a metal fork around the zinc casing or wall of the cell. Such fork is directly or by means of a contact plug connected to the respective lead.

For pressing together the individual columns of cells, telescopic spring capsules are employed, which are placed on the uppermost cells and are electro-conductive. On the under surface of a screw-secured closure-effecting cover, are provided simple sheet metal strips, which on application of the cover each come into contact with two of the spring capsules and so effect the electrical connection of one column of cells to the next.

Similar strips on the base of the frame effect the series connection of the columns of battery cells at the bottom.

A constructional example of the invention is illustrated on the accompanying drawing, in which:—

Fig. 1 is a side elevation of the battery, part of the crate being shown broken away.

Fig. 2 is a vertical section on the line II—II of Fig. 1.

Fig. 3 is a plan, part of the cover being shown broken away.

A crate-like wooden frame built up on a base $a$, presents, on both sides of a central upright partition $b$, a plurality (for example 5) of vertical channels or compartments $d$, separated by vertical transverse ribs or partitions $c$ and mainly open towards the sides, in each of which compartments are located a plurality (for example 4) of canister-like zinc-carbon cells $f$, stacked superposed without considerable side play. Battens $g$ spaced apart prevent the cells falling out yet expose their sides. Of each two adjoining columns of cells, the cells of one are arranged with their carbon poles $h$ directed upwards and the cells of the other with their carbon poles $h$ downwards. Provided on the base $a$ are metal strips $i$, which extend from the one compartment $d$ to the next, such that the zinc base of the lowermost cell of the one compartment is conductively connected to the carbon pole $h$ of the lowermost cell of the adjoining compartment. Those adjoining columns of cells which are not interconnected at the bottom, are conductively interconnected at the top in the following manner. On top in each compartment on the column of cells is placed a metal spring capsule $u$, in two telescopically interfitting halves with an interposed helical spring $v$. On top of the capsule is placed a wooden cover $m$, which on its under surface is provided with metal strips $w$, which each make contact with and conductively interconnect two spring capsules $u$. The strips are so arranged on the cover that on applying the cover, those columns of cells are interconnected at the top which are not interconnected at the bottom by the metal strips $i$ resting on the base. The cover is applied over two screw bolts $x$, which are provided on top of the partition $b$ and conveniently are so unsymmetrically located thereon that the cover cannot be incorrectly applied. At one corner of the cover, a screw terminal $y$ is provided, which serves to receive one of the leads for taking off the current and which terminates underneath the cover in a small metal plate $z$, which on application of the cover comes into contact with the spring capsule $u$ of the column of cells $f^1$ (Fig. 3).

The cover $m$ being applied and pressed home by the winged nuts applied to the screw bolts $x$, the compressed spring capsules $u$ press the columns of cells together. At the same time a conductive path through all the columns in series is established by the application of the cover, inasmuch as then every two adjoining columns are interconnected in series either at the base or at the cover.

The connection of the second lead to any desired cell for the purpose of taking off a current of the, for the time being, desired potential is effected by applying a contact clip to the freely exposed casing of the respective cell at the wide side of the crate. This clip consists of a spring metal fork *p* fitting the periphery of the casing of the cell, with a screw terminal *q*, to which the second lead can be attached in the usual manner.

After release and removal of the cover and removal of the loosely resting spring capsules *u*, any exhausted cell can be removed and exchanged or placed at the dead end of the series of cells, where it is non-interferent.

I claim:

1. In an electric battery, a crate consisting of a base, upright partitions on said base, columns of cells in series located between said partitions and resting on end on said base, spaced-apart battens across said partitions retaining and exposing said cells, a removable cover at the end of said partitions remote from said base, spring means interposed between said cover and the ends of said columns of cells remote from said base and means for applying an immediate electric contact to the freely exposed casing of one of said cells.

2. In an electric battery, a crate consisting of a base, a central upright partition on said base, transverse upright partitions on each side of said central partition, columns of cells in series located on each side of said central partition and between said transverse partitions and resting on end on said base, a removable cover at the end of said partitions remote from said base, spring means interposed between said cover and the ends of said columns of cells remote from said base and means for applying an immediate electric contact to the freely exposed casing of one of said cells.

3. In an electric battery, a crate consisting of a base, upright partitions on said base, columns of cells in series located between said partitions and resting on end on said base, a removable cover at the end of said partitions remote from said base, spring means interposed between said cover and the ends of said columns of cells remote from said base, an electric terminal on said cover connected to one of said spring means, and a spring metal forked terminal embracing the freely exposed casing of one of said cells.

4. In an electric battery, a crate consisting of a base, a central upright partition on said base, transverse partitions on each side of said central partition, columns of cells in series located on each side of said central partition and between said transverse partitions and resting on end on said base, spaced-apart battens across said transverse partitions retaining and exposing said cells, a removable cover at the end of said partitions remote from said base, spring means interposed between said cover and the ends of said columns of cells remote from said base and means for applying an immediate electric contact to the freely exposed casing of one of said cells.

5. In an electric battery, a crate consisting of a base, a central upright partition on said base, transverse partitions on each side of said central partition, columns of cells in series located on each side of said central partition and between said transverse partitions and resting on end on said base, spaced-apart battens across said transverse partitions retaining and exposing said cells, metal strips on said base electrically contacting each with two said columns, a removable cover at the end of said partitions remote from said base, spring capsules interposed between said cover and the ends of said columns of cells remote from said base, metal strips on said cover contacting each with said capsules above two said columns unconnected at the base and means for applying an immediate electric contact to the freely exposed casing of one of said cells.

6. In an electric battery, a crate consisting of a base, a central upright partition on said base, transverse partitions on each side of said central partition, columns of cells in series located on each side of said central partition and between said transverse partitions and resting on end on said base, spaced-apart battens across said transverse partitions retaining and exposing said cells, metal strips on said base electrically contacting each with two said columns, a removable cover at the end of said partitions remote from said base, spring capsules interposed between said cover and the ends of said columns of cells remote from said base, metal strips on said cover contacting each with said capsules above two said columns unconnected at the base, an electric terminal on said cover connected to one of said capsules, and a spring metal forked terminal embracing the freely exposed casing of one of said cells.

In testimony whereof I have signed my name to this specification.

OTTO TANNERT.